United States Patent [19]

Deutsch et al.

[11] Patent Number: 4,769,143

[45] Date of Patent: Sep. 6, 1988

[54] DEVICE FOR PURIFYING WATER

[75] Inventors: Alex Deutsch, Yehud; Eliezer Iafe, Raanana, both of Israel

[73] Assignee: Or-Tsurim, Jerusalem, Israel

[21] Appl. No.: 15,176

[22] Filed: Feb. 17, 1987

[51] Int. Cl.$^4$ .............................................. C02F 9/00
[52] U.S. Cl. .................................... 210/266; 210/284
[58] Field of Search .............. 210/668, 669, 694, 764, 210/806, 807, 266, 282, 283, 284, 290, 501, 502.1

[56] References Cited

U.S. PATENT DOCUMENTS

| | | | |
|---|---|---|---|
| 3,923,665 | 12/1975 | Lambert et al. | 210/501 |
| 4,196,081 | 4/1980 | Pavia | 210/284 |
| 4,298,475 | 11/1981 | Gartner | 210/282 |

Primary Examiner—Ivars Cintins
Attorney, Agent, or Firm—Bucknam and Archer

[57] ABSTRACT

The present invention relates to a device for purifying water, the device being an elongated container having an inlet and an outlet and comprising succesive adjacent sections being a. a disinfecting area, b. a membrane or filter medium having pores with a diameter of max. of about $0.2\mu$ and c. granular activated carbon. The disinfecting area is suitably a mixture of crystalline iodine with a suitable strong anionic exchanger, preferably in a ratio of 15:85.

The device may comprise in addition one or more of the following section: a. filtering section; b. a microscopic filter having pores with a diameter of max. $0.5\mu$ and/or c. bacteriostatic carbon.

7 Claims, 1 Drawing Sheet

U.S. Patent     Sep. 6, 1988     4,769,143
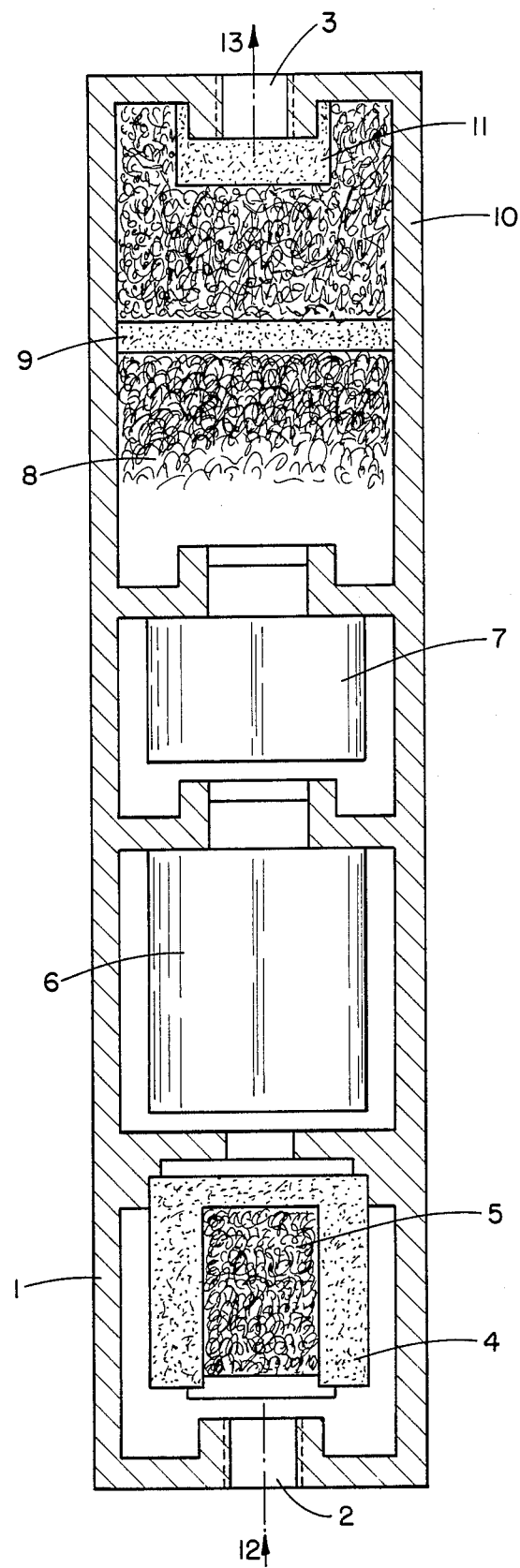

DEVICE FOR PURIFYING WATER

The present invention relates to a device for purifying water.

The environment becomes more and more polluted, in particular the water obtained from natural sources, e.g. lakes, rivers, springs, etc. The use of contaminated water may cause diseases and it is thus often desirable or even essential to purify the water before use. This is in particular the case when the water obtained from such natural sources is drunk by a small group of people, e.g. a military unit and is not supplied via an industrial installation.

There are known various methods and devices for the purification of water. Sometimes the water is boiled. This method is not always satisfactory as it requires special equipment which is not always available. There are known certain devices the use of which is not always convenient because they are often too large and too heavy and in particular do not remove all undesired particulate matter and do not kill all the bacteria present in the water.

From U.S. Pat. No. 4,298,475 is known a water purifying apparatus. This apparatus can, however, be used by one man only as the water is sucked through the apparatus by the mouth. Moreover, the materials used therein apparently do not kill all the bacteria.

There is known a device which comprises an elongated container, said container having an inlet at the bottom and an outlet at the top, within said container being placed one upon another successive adjacent sections, said sections being:

a. at least one section containing bacteriostatic carbon; and
b. one section containing crystalline iodine located between two microporous filtering layers surrounded on both sides by a strong anionic ion exchanger;
the device being connectable to water supply means.

This device constitutes a considerable improvement. However, it has also been found not to be entirely satisfactory, in particular because there is quite a long delay time (about 2 hours).

There are known methods by which the water is filtered through membranes which retain the bacteria. However in these known methods the membranes are clogged very quickly by the growing bacteria.

It has therefore been desirable to devise a device for purifying water utilising membranes but overcoming the above drawbacks. The device should substantially remove all undesired particulate matter, substantially all the bacteria should be killed but the membranes should not be clogged or in any case if clogged after an extended period of time only. This device should not be too large and heavy, and should be easy to manufacture, not be too expensive and be usable for an extended period of time.

The present invention thus consists of a device for purifying water, which device consists of an elongated container, said container having an inlet at the bottom and an outlet at the top, within the container being placed one upon another successive adjacent sections arranged from the inlet upwards, said sections being:

a. a disinfecting area;
b. a suitable membrane or filter media having pores with a diameter of max. of about $0.2\mu$;
c. granular activated carbon;
the inlet being connectable to water supply means.

As suitable disinfecting area is advantageously used a mixture of crystalline iodine (advantageously 15%) with strong anionic exchanger (advantageously 85%).

Suitable strong anionic ion exchangers to be used, if at all, in the device according to the present invention are, for example, IONAC A-641 (Ionac Chemical Co.); RELITE 3AS (Sybrone Corp.); A-410 (Rohm & Haas) etc.

However, the present invention is not restricted to the above disinfecting agent and other suitable disinfecting agents may be utilized.

As suitable membranes or filter media there may, for example, be mentioned filter media Zeta Plus C 70 C of Cuno Division of AMF Corp. This filter medium combines elektrokinetic adsorption with mechanical straining.

However, the present invention is not restricted to the use of the above filter medium.

In the preferred embodiments of the device according to the present invention the device comprises additionally one or more of the following sections:

a. a filtering section being located after the inlet, the granular activated carbon and/or one located before the outlet. As filtering section may be utilised, for example, A Mikro-Klean II filter cartridge of AMF Cuno Division of AMF Corporation. This filter is advantageously made from cellulose and melamine.

b. a microscopic filter having pores with a maximum diameter $0.5\mu$ being located between the disinfection area and membrane. This filter may for example, be a Micro-Wind II filter of AMF Cuno Division of AMF Corporation.

c. bacteriostatic carbon being located after the granular activated carbon or after the second microscopic filter, if present. The term "bacteriostatic carbon" means carbon which is impregnated with silver or on which silver has been deposited. The amount of silver released during the purification operation should not exceed the amount allowed by the Health authorities. A suitable bacteriostatic carbon is that made by Ionics Corp.

The device according to the present invention is to be connected to suitable water supply means. Said means comprise a tube, hose or the like conducting the water from the source to the device, a pump or the like and filtering means removing the coarse particulate matter. These means may be, if required, an integral part of the device according to the present invention.

A container in connection with the present invention means any suitable housing having the form of a container, tube, pipe or the like. This container may be made from any suitable non-transparent anti-corrosive material, such as stainless steel, certain rigid plastic materials, e.g., polypropylene, polyethylene, polystyrene, acetal, etc.

The size of the device according to the present invention is variable and may be adapted to the capacity required for the device.

The device may have any suitable form, e.g., a conical, cylindrical or even a rectangular one.

In order to increase the effectivity of the device according to the present invention several smaller units may be connected to each other.

The device according to the present invention may be utilised for many purposes. It is, in addition, suitable to be used by smaller units.

The combination of the disinfecting area and of the membranes achieves the desired effects. The disinfection agent causes the killed bacteria to be removed and thus the pores of the membrane or the filter medium are not clogged or only after a rather extended period of time. Moreover, the delay time is very short, i.e., the water may be used immediately.

The present invention will now be illustrated with reference to the accompanying drawing without being limited by it. This drawing shows a cross-sectional view of a device according to the present invention.

The device illustrated in the drawing comprises container 1 being provided with inlet 2 and outlet 3. The following sections are located within container 1 (from inlet 2 upwards):

Filtering section 4 being a Mikro-Klean II filter cartridge.
Disinfecting area 5 comprising 20 mg of a mixture of crystalline iodine with Relite 3 AS in a ratio of 15:85.
Microscopic filter 6 being a Micro-Wind II filter.
Filter medium 7 being a Zeta Plus C-70 C
Granular activated carbon 8.
Filtering section 9 being a Mikro-Wind II filter cartridge.
Bacteriostatic carbon 10 of Ionics Corp.
Filtering section 11 being a Mikro-Klean filter cartridge.

The device is connected to water supply means (not shown) via inlet 2. The water flows through the device in the direction indicated by arrow 12. The purified water is removed from outlet 3.

The device had a length of 23 cm. It had a conical form. The large diameter was 7 cm and the small one 6 cm. The container was made from polypropylene. The capacity of the device was 4 l/min.

The efectivenes of the device was tested by the Institute of Food Microbiology, Haifa. The test was performed with dechlorinated tap water contaminated by bacteria as follows:

a. Filter prewash with uncontaminated test water (for control b. Filtration of water containing $4 \times 10^6$ cells of Coliform bacteria per 1 ml (from stock kept at 4° C.) at the nominal rate of 2 L/min. for 40 minutes. The filtrate was collected in a container.

c. Samples of 500 ml each were collected from the filter outlet after 60 sec. 1 h., 2 h, 6 h. and 24 h from the start of the bacteriological examination.

Details of bacteriological examination:
a. Total Coliforms count was carried out on Urba Medium by pour-plate method
b. Incubation: 24 hours at 30° C.

Results

1. The bacterial counts of the different counts immediately after the beginning of the test, i.e. after 60 sec. was <10, which means excellent removal of bacteria.

2. Examination of the filtrate after 24 hour residence time in an open vessel at room temperature gave a a similar result.

We claim:

1. A device for purifying water, which consists of an elongated container, said container having an inlet at the bottom and an outlet at the top, said container having place one upon another arranged from the inlet upwardly at least the following materials:
   (a) a disinfecting material;
   (b) a membrane or filter medium having pores with a maximum diameter of about $0.2\mu$; and
   (c) granular activated carbon; the inlet being connectable to water supply means.

2. The device according to claim 1 wherein the disinfecting material is a mixture of crystalline iodine with a strong anionic exchanger.

3. The device according to claim 2, wherein the ratio iodine:exchanger is 15:85.

4. The device according to claim 3 wherein the disinfecting material is 20 mgs. of a mixture of crystalline iodine and anionic exchanger, the device is a container of conical shape.

5. The device according to claim 1 which additionally contains a filtering material being located above the inlet, above the granular activated carbon and below the outlet.

6. The device according to claim 5 which additionally contains a second filter having pores with a maximum diameter $0.5\mu$ located between the disinfecting material and the membrane.

7. The device according to claim 6 which additionally contains bacteriostatic carbon located after the granular activated carbon or after said second filter.

* * * * *